US008616362B1

(12) United States Patent
Browne et al.

(10) Patent No.: US 8,616,362 B1

(45) Date of Patent: Dec. 31, 2013

(54) SPATIALLY MODULATED MAGNETIC FIELDS FOR PART SELECTION AND ALIGNMENT ON A CONVEYOR BELT

(75) Inventors: Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/566,101

(22) Filed: Aug. 3, 2012

(51) Int. Cl.
*B65G 47/24* (2006.01)

(52) U.S. Cl.
USPC ........................................ 198/381; 198/752.1

(58) Field of Classification Search
USPC ............... 198/381, 805, 846, 847, 752.1, 758
See application file for complete search history.

(56) References Cited

U.S. PATENT DOCUMENTS

| | | | | | |
|---|---|---|---|---|---|
| 3,620,357 | A | * | 11/1971 | Folkes | 198/805 |
| 3,669,238 | A | * | 6/1972 | Folkes et al. | 198/805 |
| 3,887,997 | A | * | 6/1975 | Hartleroad et al. | 198/381 |
| 4,111,294 | A | * | 9/1978 | Carpenter et al. | 198/381 |
| 4,480,739 | A | * | 11/1984 | Haeusler | 198/381 |
| 5,613,592 | A | * | 3/1997 | Reznik et al. | 198/381 |
| 7,997,415 | B2 | * | 8/2011 | Mongan et al. | 198/381 |

* cited by examiner

*Primary Examiner* — James R Bidwell

(74) *Attorney, Agent, or Firm* — Mark S. Cohen; Pearl Cohen Zedek Latzer Baratz LLP

(57) ABSTRACT

A conveyor belt with integrated spatially-modulated magnetic arrays and a vibrating device, and a method for use thereof are described, for sorting and aligning parts. A part which is to be sorted and aligned is provided with a spatially-modulated magnetic array that is complementary to that which is integrated into the conveyor belt. The vibrating device assures that parts placed in arbitrary locations on the conveyor belt will be sufficiently moved to come into magnetic proximity with the magnetic arrays integrated into the conveyor belt. A system of multiple conveyor belts for sorting and/or aligning a number of different parts is disclosed.

3 Claims, 4 Drawing Sheets

SPATIALLY MODULATED MAGNETIC FIELDS FOR PART SELECTION AND ALIGNMENT ON A CONVEYOR BELT

BACKGROUND

Selecting, sorting, and presentation of component parts are critical in manufacturing and assembly operations. Small component parts, in particular, present special challenges in these areas, especially when the component parts are collected and made available in bulk as diverse loose components.

SUMMARY

Embodiments of the present invention provide novel methods and apparatus for selecting, sorting, and presenting component parts based on spatially-modulated magnetic arrays. In various embodiments of the invention, the terms "component part" and "part" are synonymous to identify objects for manipulation and combination in assembly, disassembly, and configuration operations. For brevity, the term "part" is used herein to refer to such a component or component part.

Spatially modulated magnetic arrays feature an arrangement of magnetic regions that vary in orientation from one spatial position to another, resulting in a magnetic multipole field that is strong at close range ("near field"), but which falls off rapidly with increasing distance. Such a magnetic multipole field is of higher order than an ordinary magnetic dipole field. A spatially modulated magnetic array may also be custom-configured with a special spatially modulated pattern of magnetic regions to have a particularly strong magnetic interaction when brought into magnetic proximity with another array that has been custom-configured to be complementary to the same pattern. The strong magnetic interaction not only can attract the spatially modulated arrays toward one another, but can also align them to particular positions and angles, according to the specific pattern. Such complementary patterns are denoted herein as having a "higher-order mutual magnetic correspondence", a term which emphasizes that the magnetic field is of higher multipole order than an ordinary magnetic dipole field.

According to various embodiments of the invention, spatially-modulated magnetic arrays with predetermined higher-order magnetic patterns are integrated into a surface of a conveyor belt, and spatially-modulated magnetic arrays with complementary higher-order magnetic patterns are integrated into component parts of a particular class, such that a component part of the class, when brought into magnetic proximity with one of the spatially-modulated magnetic arrays integrated into the conveyor belt surface, will become aligned and oriented with the conveyor belt at that location.

According to certain embodiments of the invention, the bringing of components into magnetic proximity with one of the spatially-modulated magnetic arrays integrated into the conveyor belt surface is enhanced by inducing a vibration in the conveyor belt surface, such that a component that is not in magnetic proximity to a spatially-modulated magnetic array integrated in the conveyor belt surface is caused to move relative to the surface and thereby come into magnetic proximity with an array that is integrated in the surface.

In certain embodiments of the invention, multiple conveyor belts are configured such that different conveyor belts have spatially-modulated magnetic arrays with different higher-order magnetic patterns corresponding to different classes of components. According to these embodiments the conveyor belts are positioned such that component parts that are not captured by one conveyor belt will spill over to an adjacent conveyor belt, and in this fashion a variety of different component parts can be sorted. Such a configuration of conveyor belts is thus beneficial both in manufacture and assembly operations as well as in disassembly and recycling operations.

Accordingly, an embodiment of the invention provides a method for selecting and aligning a part on a conveyor belt, the method including: integrating a spatially-modulated magnetic array having a first higher-order magnetic pattern into a first location on a surface of the conveyor belt; integrating a spatially-modulated magnetic array having a second higher-order magnetic pattern into the part, wherein the second higher-order magnetic pattern is complementary to the first higher-order magnetic pattern; placing the part on the surface of the conveyor belt; and vibrating the surface of the conveyor belt, such that the part is caused to move over the surface of the conveyor belt and come into proximity with the first location, such that the second higher-order magnetic pattern is caused to establish a higher-order mutual magnetic correspondence with the first higher-order magnetic pattern.

In addition, another embodiment of the invention provides a conveyor belt for automatically selecting and aligning a part having a first higher-order spatially-modulated magnetic array integrated therein, the part placed upon a surface of the conveyor belt, the conveyor belt surface including: a spatially-modulated magnetic array with a second higher-order magnetic pattern integrated into a location on the surface, wherein the second higher-order magnetic pattern is complementary to the first higher-order magnetic pattern; and a vibrating means operative to vibrating the surface such that the part is caused to move over the surface such that the first higher-order magnetic pattern is caused to establish a higher-order mutual magnetic correspondence with the second higher-order magnetic pattern.

Moreover, yet another embodiment of the invention provides a system of conveyor belts for automatically sorting and aligning a plurality of parts, the system including: a first conveyor belt with a first surface having: a first spatially-modulated magnetic array integrated into a first location on the first surface, the first spatially-modulated magnetic array having a first higher-order magnetic pattern; a first boundary edge beyond which a part of the plurality of parts placed on the first surface and not aligned in position relative to the first surface will fall off the first surface; and a first vibrating means operative to vibrating the first surface such that a part of the plurality of parts placed thereon is caused to move over the first surface such that: if the part has integrated therein a second spatially-modulated magnetic array having a second higher-order magnetic pattern which is complementary to the first higher-order magnetic pattern, then the part is aligned in position and orientation relative to the first surface; and if the part does not have integrated therein a second spatially-modulated magnetic array having a second higher-order magnetic pattern which is complementary to the first higher-order magnetic pattern, then the part is not aligned in position and orientation relative to the first surface and is free to continue to move beyond the first boundary edge of the first surface; and a second conveyor belt with a second surface placed such that a part of the plurality of parts moving beyond the first boundary edge of the first surface will fall onto the second surface.

Therefore, according to an embodiment of the present invention there is provided a method for selecting and aligning a part on a conveyor belt, the method including: integrating a spatially-modulated magnetic array having a first higher-order magnetic pattern into a first location on a surface of the conveyor belt; integrating a spatially-modulated magnetic array having a second higher-order magnetic pattern into the part, wherein the second higher-order magnetic pattern is complementary to the first higher-order magnetic pattern; placing the part on the surface of the conveyor belt; and vibrating the surface of the conveyor belt, such that the part is caused to move over the surface of the conveyor belt and come into proximity with the first location, such that the second higher-order magnetic pattern is caused to establish a higher-order mutual magnetic correspondence with the first higher-order magnetic pattern.

In addition, according to another embodiment of the present invention there is provided a conveyor belt for automatically selecting and aligning a part having a first higher-order spatially-modulated magnetic array integrated therein, the part placed upon a surface of the conveyor belt, the conveyor belt surface including: a spatially-modulated magnetic array with a second higher-order magnetic pattern integrated into a location on the surface, wherein the second higher-order magnetic pattern is complementary to the first higher-order magnetic pattern; and a vibrating means operative to vibrating the surface such that the part is caused to move over the surface such that the first higher-order magnetic pattern is caused to establish a higher-order mutual magnetic correspondence with the second higher-order magnetic pattern.

Furthermore, according to still another embodiment of the present invention there is provided a system of conveyor belts for automatically sorting and aligning a plurality of parts, the system including: a first conveyor belt with a first surface having: a first spatially-modulated magnetic array integrated into a first location on the first surface, the first spatially-modulated magnetic array having a first higher-order magnetic pattern; a first boundary edge beyond which a part of the plurality of parts placed on the first surface and not aligned in position relative to the first surface will fall off the first surface; and a first vibrating means operative to vibrating the first surface such that a part of the plurality of parts placed thereon is caused to move over the first surface such that: if the part has integrated therein a second spatially-modulated magnetic array having a second higher-order magnetic pattern which is complementary to the first higher-order magnetic pattern, then the part is aligned in position and orientation relative to the first surface; and if the part does not have integrated therein a second spatially-modulated magnetic array having a second higher-order magnetic pattern which is complementary to the first higher-order magnetic pattern, then the part is not aligned in position and orientation relative to the first surface and is free to continue to move beyond the first boundary edge of the first surface; and a second conveyor belt with a second surface placed such that a part of the plurality of parts moving beyond the first boundary edge of the first surface will fall onto the second surface.

BRIEF DESCRIPTION OF THE DRAWINGS

The subject matter disclosed may best be understood by reference to the following detailed description when read with the accompanying drawings in which.

Figure 1:
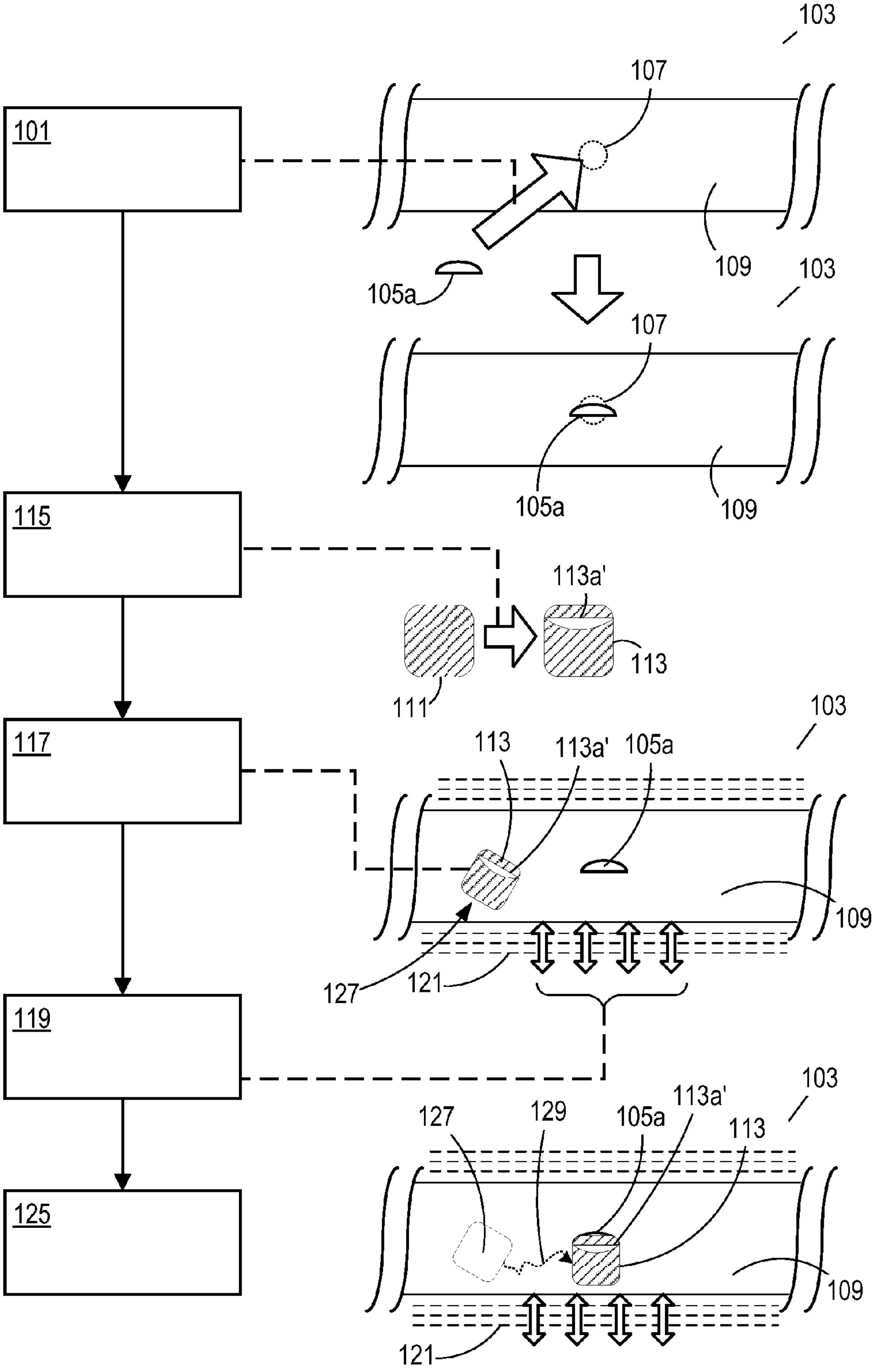
FIG. 1 illustrates a method for selecting and aligning a part on a conveyor belt according to an embodiment of the invention.

For simplicity and clarity of illustration, elements shown in the figures are not necessarily drawn to scale, and the dimensions of some elements may be exaggerated relative to other elements. In addition, reference numerals may be repeated among the figures to indicate corresponding or analogous elements.

DETAILED DESCRIPTION

FIG. 1 illustrates a method for selecting and aligning a part 113 on a conveyor belt 103 according to an embodiment of the invention.

In a step 101, a spatially-modulated magnetic array 105*a* is integrated into a location 107 on a surface 109 of conveyor belt 103. In some embodiments of the invention, conveyor belt 103 forms an endless belt; in other embodiments, surface 109 is a flat surface.

In a step 115, a spatially-modulated magnetic array 113*a*' is integrated into a part 111 to result in part 113. Spatially-modulated magnetic array 113*a*' has a higher-order magnetic pattern that is complementary to that of spatially-modulated magnetic array 105*a*.

In a step 117, part 113 is placed onto surface 109 of conveyor belt 103 in an arbitrary location 127. If arbitrary location 127 is in magnetic proximity with spatially-modulated magnetic array 105*a*, which is complementary to spatially-modulated magnetic array 113*a*', then part 113 will be immediately aligned and positioned on surface 109 of conveyor belt 103 by virtue of the higher-order mutual magnetic correspondence between complementary spatially-modulated magnetic arrays 105*a* and 113*a*', without further external action. However, if part 113 when in arbitrary location 127 is not in magnetic proximity with spatially-modulated magnetic array 105*a*, then the following steps will place part 113 into magnetic proximity with spatially-modulated magnetic array 105*a*. In a step 119 surface 109 is vibrated to induce vibrations 121, such that part 113 is caused to move relative to surface 109. In a step 125, surface 109 is continued to be vibrated, such that part 113 moves from arbitrary location 127 via a path 129 which eventually puts part 113 into magnetic proximity with spatially-modulated magnetic array 105*a*, such that part 113 will be aligned and positioned on surface 109 of conveyor belt 103, by virtue of the higher-order mutual magnetic correspondence between complementary spatially-modulated magnetic arrays 105*a* and 113*a*'.

Figure 2:
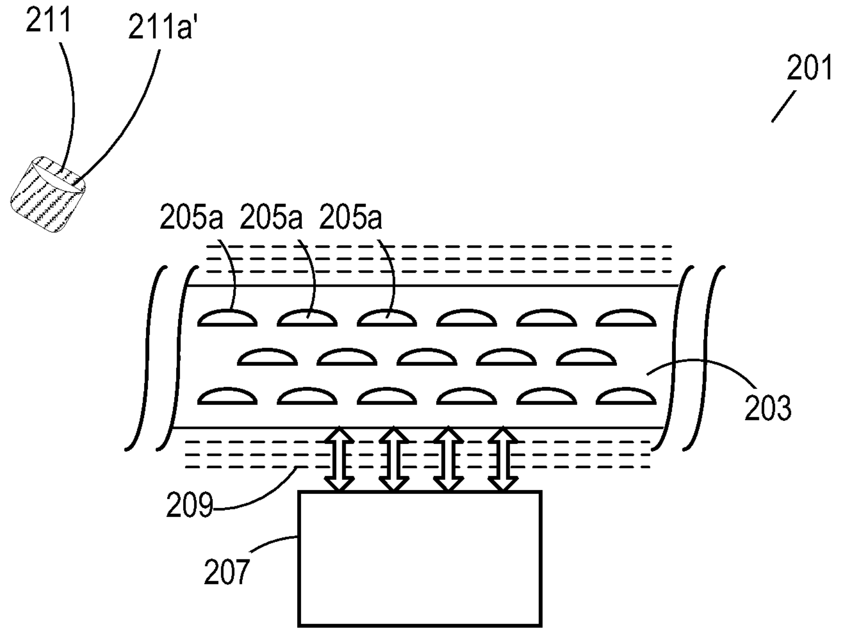
FIG. 2 illustrates a conveyor belt for automatically selecting and aligning a part according to another embodiment of the invention.

FIG. 2 illustrates a conveyor belt 201 for automatically selecting and aligning a part 211 according to an embodiment of the invention. A surface 203 of conveyor belt 201 has integrated therein multiple spatially-modulated magnetic arrays 205*a*. Part 211 has integrated therein a spatially-modulated magnetic array 211*a*', which is complementary to all instances of spatially-modulated magnetic array 205*a*. A vibrating device 207 induces vibrations into surface 203 in order to move part 211, when placed on surface 203, over surface 203 in order to cause spatially-modulated magnetic array 211*a*' of part 211 to come into magnetic proximity with spatially-modulated magnetic array 205*a*. Integrating a number of identical instances of spatially-modulated magnetic array 205*a* increases the probability of establishing magnetic proximity within a given amount of time.

Figure 3A:
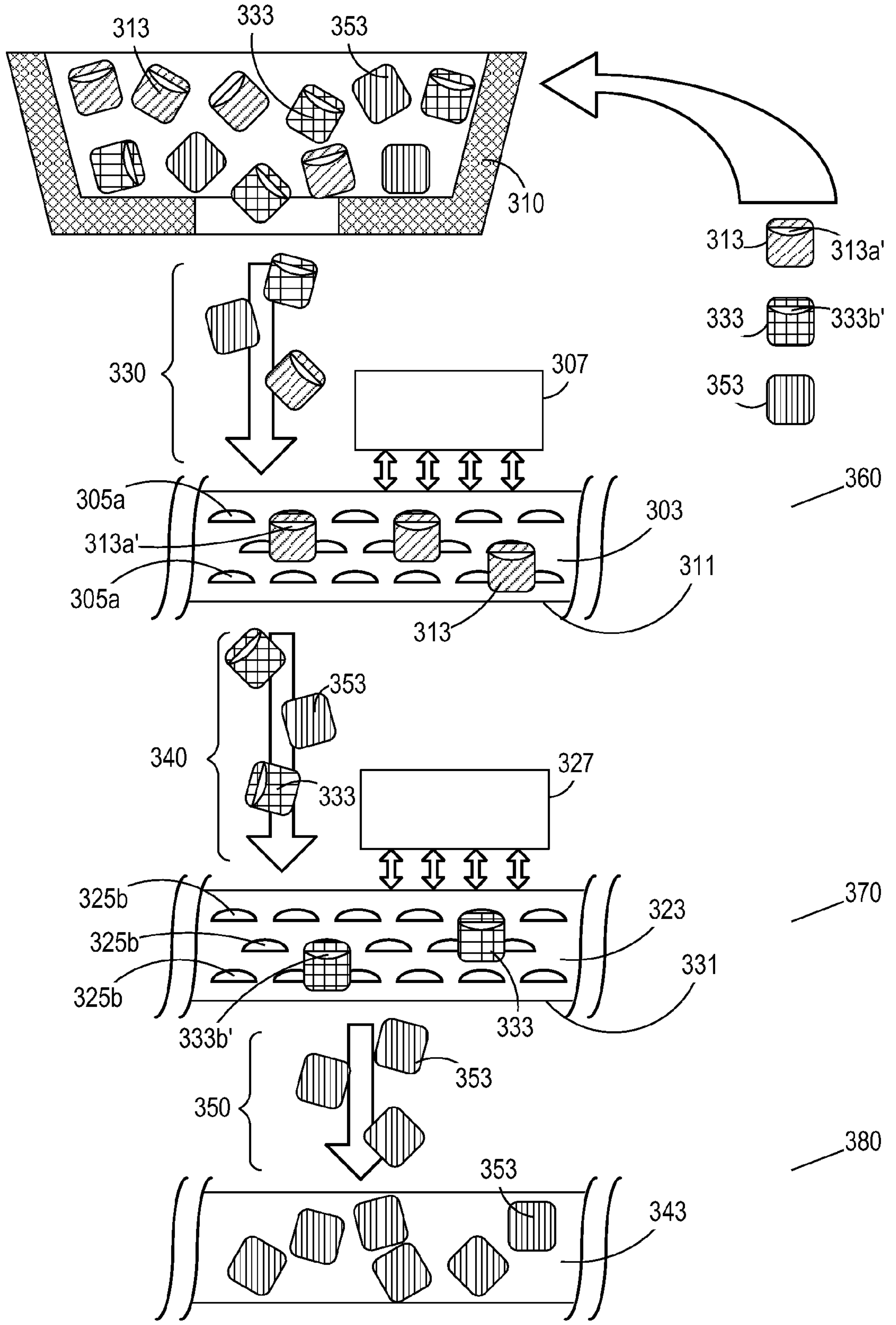
FIG. 3A illustrates a system of conveyor belts for automatically sorting and aligning a multiplicity of parts according to yet another embodiment of the invention.

FIG. 3A illustrates a non-limiting example of a system of conveyor belts 360, 370, and 380 for automatically sorting and aligning a multiplicity of parts 313, 333, and 353 according to an embodiment of the invention.

Part 313 has integrated therein a spatially-modulated magnetic array 313*a*', and part 333 has integrated therein a spatially-modulated magnetic array 333*b*'. Part 353 does not have a spatially-modulated magnetic array. Multiple instances of parts 313, 333, and 353 are put together in a mix 310, from which a stream 330 of randomly selected parts is directed to fall upon a surface 303 of conveyor belt 360. Multiple instances of a spatially-modulated magnetic array 305*a* are integrated into surface 303, which is vibrated by a vibrating device 307.

Spatially-modulated magnetic array 305*a* is complementary to spatially-modulated magnetic array 313*a*', so that when an instance of part 313 comes into magnetic proximity with an instance of spatially-modulated magnetic array 305*a* integrated into surface 303, the higher-order magnetic correspondence between spatially-modulated magnetic array 313*a*' of the instance of part 313 will align that instance of part 313 with surface 303. Instances of part 333 and part 353, however, cannot establish a higher-order magnetic correspondence with integrated instances of spatially-modulated magnetic array 305*a* in surface 303, and, when vibrated by vibrating device 307, will eventually move beyond a boundary edge 311, whereupon instances of part 333 and part 353 will fall off surface 303, as a stream 340, which is directed to fall upon a surface 323 of conveyor belt 370. Multiple instances of a spatially-modulated magnetic array 325*b* are integrated into surface 323, which is vibrated by a vibrating device 327.

Spatially-modulated magnetic array 325*b* is complementary to spatially-modulated magnetic array 333*b*', so that when an instance of part 333 comes into magnetic proximity with an instance of spatially-modulated magnetic array 325*a* integrated into surface 323, the higher-order magnetic correspondence between spatially-modulated magnetic array 333*b*' of the instance of part 333 will align that instance of part 333 with surface 323. Instances of part 353, however, cannot establish a higher-order magnetic correspondence with integrated instances of spatially-modulated magnetic array 325*a* in surface 323, and, when vibrated by vibrating device 327, will eventually move beyond a boundary edge 331, whereupon instances of part 353 will fall off surface 323, as a stream 350, which is directed to fall upon a surface 343 of conveyor belt 380.

Thus, in this non-limiting example, parts 313, 333, and 353 are sorted onto conveyor belts 360, 370, and 380, respectively. Moreover, parts 313 and 333 are aligned onto surfaces 303 and 323, respectively.

Figure 3B:
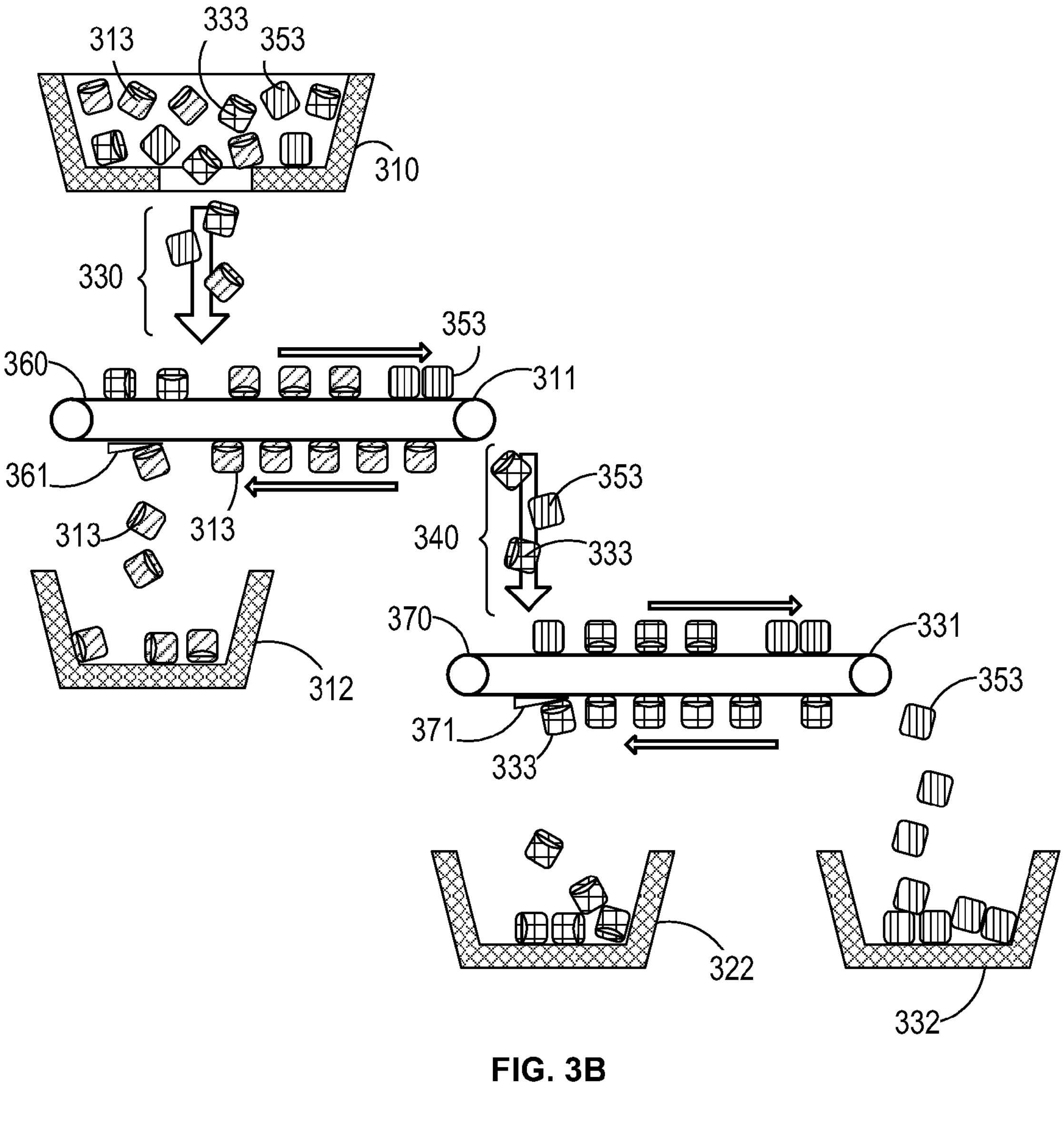
FIG. 3B illustrates another configuration of the system shown in FIG. 3A, according to a related embodiment of the invention.

FIG. 3B illustrates another configuration of the system described above and illustrated in FIG. 3A, according to a related embodiment of the invention. Whereas FIG. 3A illustrates a system of conveyor belts 360, 370, and 380 for automatically sorting and aligning a multiplicity of parts 313, 333, and 353, FIG. 3B illustrates a configuration for sorting only.

In FIG. 3B, conveyor belt 360 has boundary edge 311 in the location where belt inverts, relying on the higher-order magnetic correspondence to hold parts 313 to conveyor belt 360 even when inverted. A separator 361 separates parts 313 into a collector 312, while parts 333 and 353 fall off after crossing boundary edge 311.

Likewise, conveyor belt 370 separates parts 333 using a separator 371 into a collector 322, while parts 353 fall off after crossing boundary edge 331, into a collector 332.

What is claimed is:

1. A method for selecting and aligning a part on a conveyor belt, the method comprising:

integrating a spatially-modulated magnetic array having a first higher-order magnetic pattern into a first location on a surface of the conveyor belt;

integrating a spatially-modulated magnetic array having a second higher-order magnetic pattern into the part, wherein the second higher-order magnetic pattern is complementary to the first higher-order magnetic pattern;

placing the part on the surface of the conveyor belt; and vibrating the surface of the conveyor belt, such that the part is caused to move over the surface of the conveyor belt and come into proximity with the first location, such that the second higher-order magnetic pattern is caused to establish a higher-order mutual magnetic correspondence with the first higher-order magnetic pattern.

2. A conveyor belt for automatically selecting and aligning a part having a first higher-order spatially-modulated magnetic array integrated therein, the part placed upon a surface of the conveyor belt, the conveyor belt surface comprising:

a spatially-modulated magnetic array with a second higher-order magnetic pattern integrated into a location on the surface, wherein the second higher-order magnetic pattern is complementary to the first higher-order magnetic pattern; and a vibrating means operative to vibrating the surface such that the part is caused to move over the surface such that the first higher-order magnetic pattern is caused to establish a higher-order mutual magnetic correspondence with the second higher-order magnetic pattern.

3. A system of conveyor belts for automatically sorting and aligning a plurality of parts, the system comprising:

a first conveyor belt with a first surface having:

- a first spatially-modulated magnetic array integrated into a first location on the first surface, the first spatially-modulated magnetic array having a first higher-order magnetic pattern;
- a first boundary edge beyond which a part of the plurality of parts placed on the first surface and not aligned in position relative to the first surface will fall off the first surface; and
- a first vibrating means operative to vibrating the first surface such that a part of the plurality of parts placed thereon is caused to move over the first surface such that:
  - if the part has integrated therein a second spatially-modulated magnetic array having a second higher-order magnetic pattern which is complementary to the first higher-order magnetic pattern, then the part is aligned in position and orientation relative to the first surface; and
  - if the part does not have integrated therein a second spatially-modulated magnetic array having a second higher-order magnetic pattern which is complementary to the first higher-order magnetic pattern, then the part is not aligned in position and orientation relative to the first surface and is free to continue to move beyond the first boundary edge of the first surface; and a second conveyor belt with a second surface placed such that a part of the plurality of parts moving beyond the first boundary edge of the first surface will fall onto the second surface.

* * * * *